(12) United States Patent
Eisenbarth et al.

(10) Patent No.: US 9,631,415 B2
(45) Date of Patent: Apr. 25, 2017

(54) PAULOWNIA BASED FENESTRATION STRUCTURES

(71) Applicant: Pella Corporation, Pella, IA (US)

(72) Inventors: Travis M. Eisenbarth, Pella, IA (US); Evan R. Vande Haar, Pella, IA (US)

(73) Assignee: PELLA CORPORATION, Pella, IA (US)

( * ) Notice: Subject to any disclaimer, the term of this patent is extended or adjusted under 35 U.S.C. 154(b) by 0 days.

(21) Appl. No.: 14/739,969

(22) Filed: Jun. 15, 2015

(65) Prior Publication Data

US 2015/0361712 A1 Dec. 17, 2015

Related U.S. Application Data

(60) Provisional application No. 62/011,967, filed on Jun. 13, 2014.

(51) Int. Cl.
  *E04G 21/00* (2006.01)
  *E04G 23/00* (2006.01)
  (Continued)

(52) U.S. Cl.
  CPC ............... *E06B 1/08* (2013.01); *E06B 3/10* (2013.01); *E06B 3/26345* (2013.01);
  (Continued)

(58) Field of Classification Search
  CPC ..... E06B 1/04; E06B 1/06; E06B 1/08; E06B 1/32; E06B 1/36; E06B 3/00; E06B 3/22
  (Continued)

(56) References Cited

U.S. PATENT DOCUMENTS 1,935,037 A * 11/1933 Madsen ................... E06B 1/62
  49/404
1,989,305 A * 1/1935 Bartuska ................... E06B 3/64
  52/172

(Continued)

FOREIGN PATENT DOCUMENTS

CN        2132820 Y    5/1993
CN      202659032 U    1/2013
  (Continued)

*Primary Examiner* — Chi Q Nguyen
(74) *Attorney, Agent, or Firm* — Faegre, Baker, Daniels LLP

(57) ABSTRACT

The fenestration structures include external frame segments facing the interior and exterior surfaces of a building wall, and an internal frame segment "sandwiched" between the external frame segments. The external frame segments are made from a relatively hard, dense and/or resilient material, such as hard wood, while the internal frame segment is made from paulownia which is a moisture-resistant, dimensionally stable thermal barrier material. The external frame segments therefore provide durable and attractive exterior and interior surfaces of the fenestration frame, while the internal paulownia segment provides superior resistance to thermal transfer across the frame, while also remaining dimensionally stable across a variety of moisture and temperature levels. Internal paulownia segments may be positioned around the entire periphery of the fenestration frame to create a comprehensive thermal barrier.

20 Claims, 4 Drawing Sheets

(51) Int. Cl.
| | | |
|---|---|---|
| *E04B 1/00* | (2006.01) | |
| *E06B 1/08* | (2006.01) | |
| *E06B 3/10* | (2006.01) | |
| *E06B 3/263* | (2006.01) | |
| *E06B 3/30* | (2006.01) | |
| *E06B 3/26* | (2006.01) | |
| *E06B 1/36* | (2006.01) | |
| *E06B 1/32* | (2006.01) | |
| *E06B 3/00* | (2006.01) | |
| *E06B 1/04* | (2006.01) | |
| *E06B 3/22* | (2006.01) | |
| *E06B 1/62* | (2006.01) | |
| *E06B 1/06* | (2006.01) | |

(52) U.S. Cl.
CPC ............... *E06B 3/302* (2013.01); *E06B 1/04* (2013.01); *E06B 1/06* (2013.01); *E06B 1/32* (2013.01); *E06B 1/36* (2013.01); *E06B 3/00* (2013.01); *E06B 3/22* (2013.01); *E06B 2001/628* (2013.01); *E06B 2003/261* (2013.01); *Y02B 80/28* (2013.01); *Y10T 29/49629* (2015.01)

(58) Field of Classification Search
USPC .......................................................... 49/504
See application file for complete search history.

(56) References Cited

U.S. PATENT DOCUMENTS

| | | | | | |
|---|---|---|---|---|---|
| 2,191,660 | A * | 2/1940 | Hirschey | ................... | E06B 1/62 49/404 |
| 2,993,242 | A * | 7/1961 | Leisibach | ................. | E06B 3/24 52/204.593 |
| 3,016,993 | A * | 1/1962 | Owen | ..................... | E06B 1/045 52/204.591 |
| 3,156,022 | A * | 11/1964 | Schlegel | ............... | E06B 1/6046 403/296 |
| 3,203,053 | A * | 8/1965 | Lane | ................... | E06B 3/26307 49/489.1 |
| 3,295,277 | A * | 1/1967 | Potter | ........................ | E06B 1/62 49/504 |
| 3,722,161 | A * | 3/1973 | Brown | ....................... | E04B 2/96 52/204.591 |
| 3,971,178 | A * | 7/1976 | Mazzoni | ................... | E06B 3/5418 52/172 |
| 4,267,673 | A * | 5/1981 | Coulston | ................ | E06B 1/325 428/57 |
| 4,299,060 | A * | 11/1981 | Tippmann | ............... | E06B 3/221 49/501 |
| 4,432,179 | A * | 2/1984 | Bachmann | .............. | E06B 1/325 49/DIG. 1 |
| 4,601,144 | A * | 7/1986 | Tinti | ..................... | E04F 19/049 52/211 |
| 4,702,050 | A * | 10/1987 | Giguere | .................. | E06B 3/645 52/202 |
| 4,825,609 | A * | 5/1989 | Rundo | .................. | E06B 3/5864 52/202 |
| 4,982,530 | A * | 1/1991 | Palmer | ................ | E06B 3/26345 49/501 |
| 5,119,609 | A * | 6/1992 | Tait | ........................ | E06B 1/6015 206/321 |
| 5,619,828 | A * | 4/1997 | Ver Meer | .............. | E06B 1/6015 29/897.312 |
| 5,687,518 | A * | 11/1997 | Endo | ......................... | E06B 3/10 49/501 |
| 6,223,484 | B1 * | 5/2001 | Minter | .................. | E06B 1/6015 49/504 |
| 7,877,951 | B2 * | 2/2011 | Jacobsen | ................... | E06B 1/62 277/650 |
| 8,024,898 | B2 * | 9/2011 | Alvarado | .................. | E06B 1/02 52/204.1 |
| 2004/0206025 | A1 * | 10/2004 | Panto | ........................ | E06B 3/10 52/211 |
| 2008/0127606 | A1 | 6/2008 | Kuroiwa | | |
| 2009/0218249 | A1 * | 9/2009 | Stalter | .................... | B32B 21/13 206/524.2 |

FOREIGN PATENT DOCUMENTS

| | | |
|---|---|---|
| CN | 202788368 U | 3/2013 |
| JP | H-07208033 A | 8/1995 |
| JP | H-07259445 A | 10/1995 |
| JP | H-07293127 A | 11/1995 |
| JP | H-07324561 A | 12/1995 |
| JP | H-09256746 A | 9/1997 |
| JP | H-11291202 A | 10/1999 |
| JP | 2000179245 A | 6/2000 |
| JP | 2000310090 A | 11/2000 |
| JP | 2001231697 A | 8/2001 |
| JP | 2003074260 A | 3/2003 |
| JP | 2003074261 A | 3/2003 |
| JP | 2003090177 A | 3/2003 |
| JP | 2004108081 A | 3/2004 |
| JP | 2006266073 A | 10/2006 |
| JP | 2007326980 A | 12/2007 |
| JP | 2007332612 A | 12/2007 |
| JP | 2008174931 A | 7/2008 |
| JP | 2008180019 A | 8/2008 |
| JP | 2010255185 A | 11/2010 |
| JP | 2011012473 A | 1/2011 |

* cited by examiner

PAULOWNIA BASED FENESTRATION STRUCTURES

CROSS REFERENCE TO RELATED APPLICATION

The present application claims the benefit under Title 35, U.S.C. §119(e) of U.S. Provisional Patent Application Ser. No. 62/011,967, filed on Jun. 13, 2014 and entitled PAULOWNIA BASED WINDOW AND DOOR FRAMES, the entire disclosure of which is hereby expressly incorporated by reference herein.

BACKGROUND

1. Technical Field

The present disclosure relates to fenestrations and, in particular, to framing structures used to frame building fenestrations.

2. Description of Related Art

Fenestration frames, such as door frames and window frames used in commercial and residential construction, provide a structural and sometimes decorative interface between the framed opening and the adjacent building wall. Typically, fenestration frames use a combination of wood and/or metal to provide an appropriately sized, framed opening for receipt of a window or door, while also providing a weather resistant seal between the outside surface of the building and the interior wall structures. In one standard arrangement, wooden framing structures are arranged around the periphery of an opening in a wall to form a sill/threshold at a lower edge, a header at an upper edge, and jambs at the side edges. These four framing structures are dimensionally controlled to provide a framed opening sized to receive a particular window or door. Each framing structure may be made from various kinds of material, such as certain species of wood chosen for workability, resistance to damage from weather and impact, and insulative value. Many hard woods and some soft woods are known to be suitable for fenestration framing.

For example, FIG. 1 schematically illustrates a solid-core fenestration framing member 10 having an interior surface 12 adapted to face inwardly toward the interior of a building, and an opposed exterior surface 14 adapted to face outwardly from the exterior of the building. A single monolithic material extends across the frame width $W_1$. In some applications, framing member 10 may be formed from a resilient material such as hardwood, which provides a durable wear surface at interior and exterior surfaces 12, 14. However, such hardwood materials may be costly and may have insufficient resistance to thermal transfer (i.e., its "R-value") for some applications.

In some cases, moisture barriers are also used at the exterior of the fenestration frame for additional weather resistance. Such moisture barriers are typically made of aluminum or vinyl. Thermal barriers may also be employed, including foam insulation or other insulative materials, to impede heat and/or air exchange between the interior and exterior of the building around gaps between the fenestration frame and the adjacent structures.

SUMMARY

The present disclosure provides fenestration framing structures, including exterior framing, sashes and panels, which span the interior and exterior surfaces of a building wall. The fenestration structures include external frame segments facing the interior and exterior surfaces and an internal frame segment "sandwiched" between the external frame segments. The external frame segments are made from a relatively hard, dense and/or resilient material, such as hard wood, while the internal frame segment is made from a moisture-resistant, dimensionally stable thermal barrier material such as paulownia. The external frame segments therefore provide durable and attractive exterior and interior surfaces of the fenestration frame, while the internal paulownia segment provides superior resistance to thermal transfer across the frame, while also remaining dimensionally stable across a variety of moisture and temperature levels. In one exemplary embodiment, such internal paulownia segments are positioned around the entire periphery of the fenestration frame and completely occupy the radial distance from the edge of the window or door to the adjacent edge of the building wall, such that the paulownia inserts create a comprehensive thermal barrier.

In one embodiment thereof, the present disclosure provides a composite fenestration frame including: a plurality of frame segments defining a central opening through the fenestration frame, the plurality of frame segments cooperating to define an exterior frame surface on one side of the central opening and an interior frame surface on an opposing side of the central opening; at least one of the plurality of frame segments comprising an internal frame segment made from paulownia and an external frame segment made from a second material having a material property different from paulownia, the internal frame segment substantially completely covered by the exterior frame surface and the interior frame surface, whereby the internal frame segment is not exposed.

In another embodiment thereof, the present disclosure provides a method of installing a composite fenestration frame of a building, the method including: installing an internal frame segment made from paulownia at a peripheral portion of a fenestration opening; installing a first external frame segment at the peripheral portion of the fenestration opening and adjacent an interior wall of the building, such that the first external frame segment substantially completely covers the internal frame segment from the interior of the building, the first external frame segment made from a first material having a material property different from paulownia; and installing a second external frame segment at the peripheral portion of the fenestration opening and adjacent an exterior wall, such that the second external frame segment substantially completely covers the internal frame segment from the exterior of the building, the second external frame segment made from a second material having a material property different from paulownia.

In yet another embodiment thereof, the present disclosure provides a method of assembling a composite fenestration frame, the method including: forming at least a portion of a periphery of the fenestration frame with an internal frame segment made from paulownia, the internal frame segment having at least one exterior-facing surface and at least one interior-facing surface opposed to the exterior-facing surface; assembling an interior frame segment over the interior-facing surface of the internal frame segment at the periphery of the fenestration frame, such that the interior frame segment substantially completely covers the interior-facing surface of internal frame segment, the interior frame segment made from a first material having a material property different from paulownia; and assembling an exterior frame segment over the exterior-facing surface of the internal frame segment at the periphery of the fenestration frame, such that the exterior frame segment substantially completely covers the exterior-facing surface of internal frame segment, the exterior frame segment made from a second material having a material property different from paulownia.

BRIEF DESCRIPTION OF THE DRAWINGS

The above-mentioned and other features and advantages of the present disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

Figure 1:
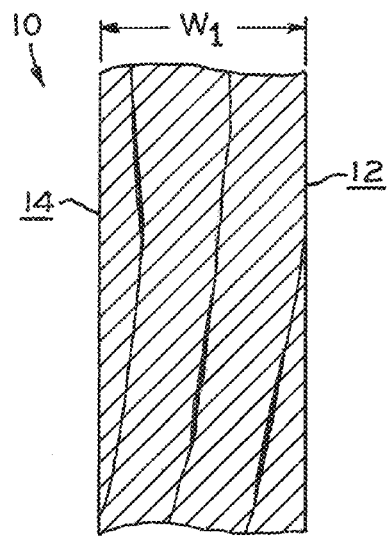
FIG. 1 is a schematic cross-section, elevation view of a solid-core fenestration framing member.

The present disclosure provides fenestration frames with a concealed paulownia insert which serves to enhance thermal efficiency, reduce weight and provide rot resistance to the overall frame while maintaining the outward appearance, toughness and durability typically associated with traditional framing materials. Although examples of fenestration members are provided in the drawings and description that follows, for purposes of the present disclosure and as described in greater detail below, the various features and concepts associated with those examples are applicable across fenestration frames, or frame members. The term "fenestration frame" or "frame members" as used herein encompasses a variety of fenestration structures respectively formed from one or more frame segments, including an outer fenestration frame sized to receive a window or door (e.g., one or more jamb, sill or head portions), an inner fenestration frame received within the outer frame (e.g., one or more sash members), and/or other frame structures used in fenestration products (e.g., stiles, rails, astragals, or others). In addition to the composite fenestration frames described below, it is also contemplated that composite panels may be provided with similarly concealed paulownia inserts.

Figure 2:
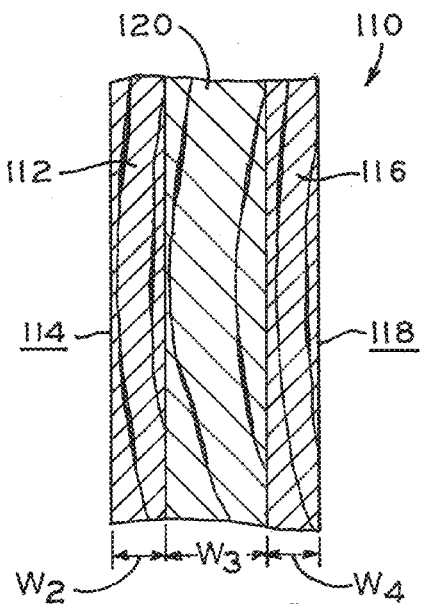
FIG. 2 is a schematic cross-section, elevation view of a composite fenestration framing member in accordance with the present disclosure.

FIG. 2 schematically illustrates a composite fenestration frame 110 made in accordance with the present disclosure. Frame 110 has exterior external frame segment 112 and interior external frame segment 116 positioned on either side of an internal frame segment 120. For purposes of the present disclosure, "external" refers to surfaces and structures of a particular assembly that are viewable from the exterior or interior of a building (though of course, such surfaces and structures may be subsequently covered). Conversely, "internal" refers to surfaces and structures of the assembly that are hidden from view when the fenestration unit is closed because they are covered over by external (i.e., interior or exterior) structures.

Exterior external frame segment 112 of frame 110 defines exterior surface 114, which is adapted to face outwardly toward the ambient environment around a building or structure as further described below. Interior external frame segment 116 defines interior surface 118 adapted to face inwardly toward the interior of the structure, as also described below. Exterior frame segment 112 is made from a first material having a relatively high density and/or modulus of elasticity appropriate to its intended use as an exterior facing material exposed to weather, temperature fluctuations and impact from flying debris. For example, exterior frame segment 112 may be made from a hardwood material such as cedar, redwood, mahogany, ipe or teak, or a soft wood material such as pine, spruce or fir. Bamboo may also be used. In an exemplary embodiment, exterior frame segment 112 may have a density of at least 22 lb/ft$^3$ and a modulus of elasticity of at least 5.5 GPa (560 kg/mm$^2$) (e.g., pine wood). In some instances, exterior frame segment 112 may be made from much more dense materials, such as ebony with a density of 83 lb/ft$^3$.

Similarly, interior frame segment 116 may be made from a wood material appropriate for a use in a temperature controlled interior of a home or business, such as oak, maple, cherry and walnut. In an exemplary embodiment, exterior and interior external frame segments 112 and 116 may each have a density of at least 22 lb/ft$^3$ (352 kg/m$^3$) and a modulus of elasticity of at least 5.5 GPa (560 kg/mm$^2$) (e.g., pine wood), though more dense materials may be used up to and including ebony as noted above. Moreover, it is contemplated that any of the materials listed above for interior or exterior use may be used for any portion of a fenestration frame in accordance with the present disclosure, as appropriate for a particular application.

Internal frame segment 120 is made from paulownia, which is a relatively soft but highly insulative, lightweight, rot resistant and fire resistant hardwood material. For example, paulownia has a modulus of elasticity of about 4.38 GPa and a density of about 18 lb/ft$^3$ (280 kg/m$^3$), substantially less that external frame segments 112, 116 and less still when compared exemplary hardwood materials such as oak (with a modulus of elasticity of about 12 GPa and a density of about 45 lb/ft$^3$). Thus, the use of paulownia for internal frame segment 120 reduces the overall weight of composite fenestration frame 110 as compared to monolithic fenestration frame 10 (FIG. 1). In addition, paulownia has a lower thermal conductivity as compared to soft woods and hard woods used for external frame segments 112, 116, such that composite fenestration frame 110 is less thermally conductive (and therefore provides better thermal insulation or "R-value") as compared to monolithic fenestration frame 10. Specifically, paulownia has thermal conductivity coefficients on the order of 0.10 kcal/mh degrees C., while hardwoods are on the order of 0.14 kcal/mh degrees C. The weight, conductivity and other benefits of using paulownia for internal frame segment 120 are realized with no compromise in the overall weatherability, bending strength and dent/scar resistance of composite fenestration frame 110, because traditional high-modulus materials are provided for the exposed surfaces on external frame segments 112, 116 as noted above.

Referring still to FIG. 2, exterior and interior external frame segments 112, 116 define widths $W_2$, $W_4$ respectively. Internal frame segment 120 defines width $W_3$. In an exemplary embodiment, widths $W_2$ and $W_4$ are large enough to provide a robust strength and resilience for exterior and interior surfaces 114, 118, respectively, while width $W_3$ may be made as large as practical to provide maximum thermal and weight benefits as described above. In one particular exemplary embodiment, width $W_3$ of internal frame segment 120 is at least half of the overall width (i.e., $W_2+W_3+W_4$) of composite fenestration frame 110, such as 1-inch out of a 2-inch overall frame thickness.

Figure 3:
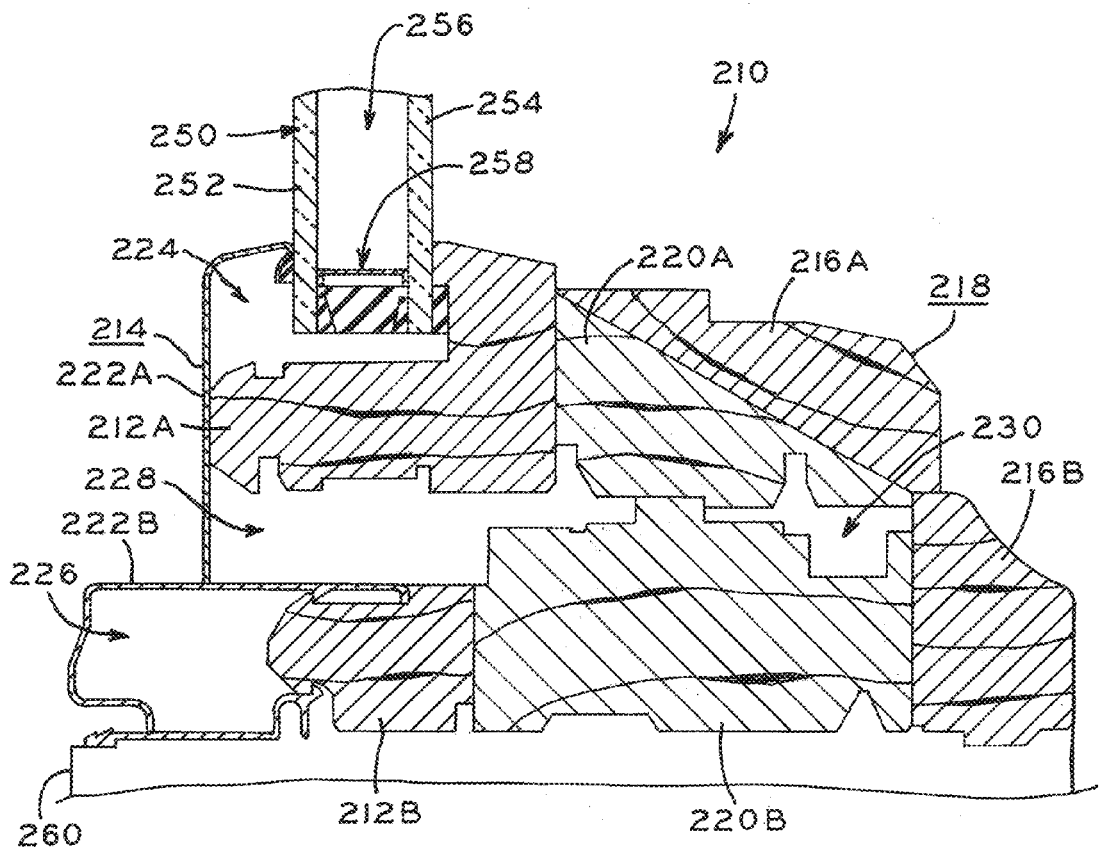
FIG. 3 is a cross-section, elevation view of a sill of a composite window frame in accordance with the present disclosure, it being understood that the window frame may have jambs and header with substantially identical cross-sections.

Turning now to FIG. 3, a cross-section of the sill of composite window frame 210 is illustrated. The illustrated sill forms the lower portion or base of a generally rectangular window frame sized and adapted to house and secure window 250 within a fenestration formed in wall 260 of a building. Although only the sill of composite window frame 210 is illustrated in FIG. 3, it is understood that corresponding jambs formed at the left and right sides of the fenestration and a header formed at the top of the fenestration may have substantially similar or identical cross-sections. As described in further detail below with respect to FIGS. 6 and 7, the overall design of the sill of composite window frame 210 may be carried through the left and right jambs 238, 240 and the frame header 236 to impart the thermal and weight benefits of internal paulownia frame segments (i.e., segments 220A and 220B described below) to the entire circumference of fenestration frame 210.

Window frame 210 has the same overall structure and function provided by fenestration frame 110 described above, and corresponding structures of frame 210 have corresponding reference numbers to frame 110, except with 100 added thereto. However, window frame 210 includes various components whose size, shape and placement are particularly suitable for use in conjunction with window 250 (as further described below). In the illustrated embodiment, window 250 is an insulated glass panel including exterior window pane 252 and interior window pane 254 forming void 256 therebetween. A seal assembly 258 spans the gap between panes 252 and 254 around the periphery of window 250 to seal void 256 from the ambient environment. Void 256 may be evacuated, filled with an inert gas such as argon, or provided as an air space to minimize thermal transfer between the inside and outside of the building via window 250.

Window frame 210 includes two exterior external frame segments, including upper exterior frame segment 212A (shown as the lower rail of a window sash) and lower exterior frame segment 212B (forming part of the sill of the window assembly). Moisture barriers 222A and 222B, which may be aluminum extrusions, interface with exterior frame segments 212A, 212B respectively as illustrated to form the overall exterior external portion of window frame 210, with moisture barriers 222A, 222B cooperating to form exterior surface 214 facing outwardly and frame segments 212A, 212B providing the overall structure of the exterior external frame portion.

As shown in FIG. 3, upper exterior frame segment 212A cooperates with the upper moisture barrier 222A to form a cradle which receives window 250 and defines an upper exterior air pocket 224. Window 250, moisture barrier 222A and frame segment 212A all move upwardly when the window is opened, and are placed into the illustrated configuration when the window is closed. Lower exterior frame segment 212B is fixed by a snap fit structure to lower moisture barrier 222B and defines a lower air pocket 226. Upper and lower exterior frame segments 212A, 212B are spaced apart from one another when the window is closed (as illustrated) to form an intermediate air pocket 228, which is also bounded by moisture barriers 222A, 222B and upper and lower internal frame segments 220A, 220B as illustrated.

Upper internal frame segment 220A is affixed (e.g., adhesively) to an interior framing surface of upper external frame segment 212A. Lower internal frame segment 220B is similarly affixed to lower exterior frame segment 212B as illustrated, and is also affixed to upper internal frame segment 220A. In the illustrated embodiment, internal frame segments 220A, 220B create an uninterrupted vertical span of paulownia extending from the bottom edge of window 250 to the top edge of wall 260. As described in further detail below with respect to FIGS. 6 and 7, this uninterrupted vertical span provides a comprehensive thermal barrier between exterior and interior surfaces 214, 218.

At the exposed interior side of window frame 210, upper interior external frame segment 216A is affixed (i.e., adhesively) to upper internal frame segment 220A and abuts upper exterior external frame segment 212A such that no part of upper internal frame segment 220A is exposed at the interior of the building when the window is closed (as shown in FIG. 3). Similarly, lower interior external frame segment 216B is affixed (i.e., adhesively) to both upper interior frame segment 216A and lower internal frame segment 220B such that no portion of segment 220B is exposed to the building interior. In the exemplary embodiment illustrated in FIG. 3, upper and lower internal frame segments 220A, 220B cooperate with lower interior frame segment 216B to define an interior air pocket 230.

As described above with respect to composite fenestration frame 110, internal frame segments 220A, 220B shown in FIG. 3 are made of paulownia while exterior frame segments 212A, 212B and interior frame segments 216A, 216B are made of a different material having a higher modulus of elasticity, higher density and/or more thermally conductive material as compared to paulownia. In addition, moisture barriers 222A, 222B are made from, e.g., aluminum which also has a higher modulus of elasticity, higher conductivity and higher density compared to the paulownia material of internal frame segments 220A, 220B. Thus, as shown in FIG. 3 and described above, no part of exterior surface 214 or interior surface 218 of window frame 210 is formed from exposed portions of internal frame segments 220A, 220B. Instead, exterior and interior surfaces 214, 218 are formed entirely from the denser and/or higher-modulus materials used for the external frame segments 212A, 212B, 216A and 216B, and/or moisture barriers 222A, 222B.

Thus, the advantages of higher modulus, higher density and/or lower thermal conductivity materials used for external frame segments 212A, 212B, 216A, 216B and moisture barriers 222A, 222B are fully realized while window frame 210 still benefits from the thermal, weight, and other advantages imparted by the use of paulownia in the space between window 250 and wall 260.

Figure 4:
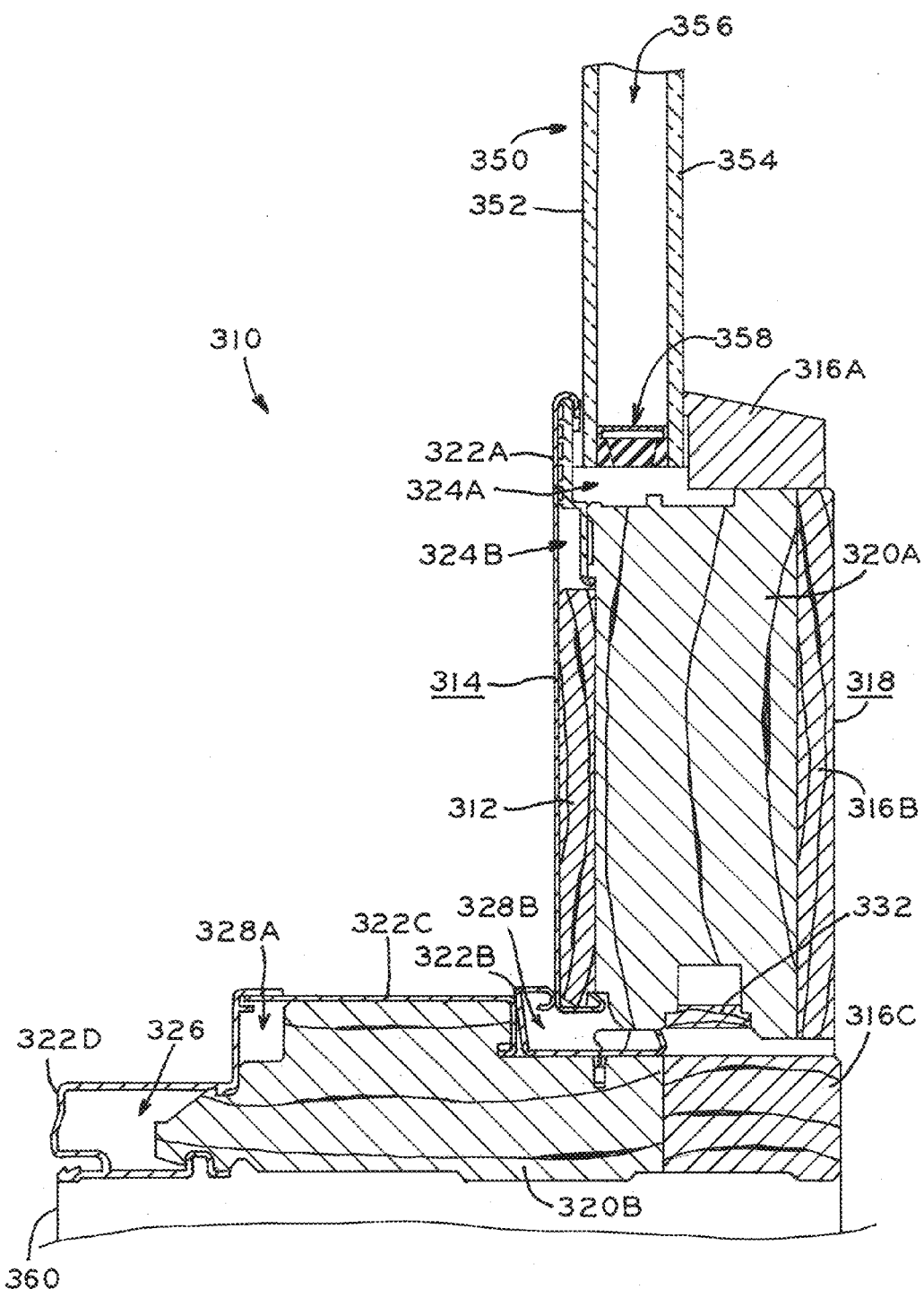
FIG. 4 is a cross-section, elevation view of a threshold of a door frame in accordance with the present disclosure, it being understood that the door frame may have jambs and header with substantially identical cross-sections.

Turning now to FIG. 4, another composite fenestration frame 310 in accordance with the present disclosure is illustrated. Fenestration frame 310 has a similar overall structure and function to window frame 210 described in detail above, and corresponding reference numerals indicate corresponding structures among frames 210 and 310, but with 100 added to the structures of frame 310. However, composite fenestration frame 310 is formed as a door frame (e.g., for a hinged patio door) with internal paulownia frame members for both the outer frame and door sash, while traditional higher-modulus and higher-density materials are used at the exterior.

FIG. 4 illustrates door frame 310 including a threshold and a bottom portion of a door sash of a pivoting glass door. For purposes of the present disclosure and as further described below, door frame 310 includes both the fixed fenestration frame (including the threshold) and the pivoting sash or sashes and insulated glass panels of the door or doors mounted to the fixed frame. It is to be understood that the other portions of door frame 310, including left and right jambs and the door frame header of the fixed fenestration frame, may have the same or a similar cross-section as the illustrated threshold. Similarly, the left and right vertical frame segments or members (i.e., the stiles) and the upper frame segment or member (i.e., the upper rail) of the sash of the glass door may also have a similar or identical cross-section to the bottom frame segment or member (i.e., the bottom rail) shown in FIG. 4.

In the door sash portion of composite door frame 310, only a single exterior external frame segment 312 is utilized, behind door moisture barrier 322A of the door sash portion of frame 310 and exterior of internal frame segment 320A. At the interior portion of the door sash, an upper interior frame segment 316A and a lower interior frame segment 316B are provided to completely cover the otherwise exposed interior surfaces of internal frame segment 320A. Finish piece 332 is affixed at the bottom of internal frame segment 320A as shown, such for covering a groove at the bottom of frame segment 320A. Door window 350, shown as a pane of insulated glass, is constructed similarly to window pane 250 of window frame 210 described above, and is cradled by the door sash between upper interior external frame segment 316A and an upper portion of moisture barrier 322A as illustrated. An upper air pocket 324A is bounded by window 350 (and in particular, seal assembly 358), interior external frame segment 316A, internal door frame segment 320A, and a portion of upper moisture barrier 322A. A second, lower air pocket 324B is formed between portions of moisture barrier 322A and upper interior surface of exterior frame segment 312.

Thus, all surfaces of internal frame segment 320A are covered by external frame segment 312, 316A, and 316B, as well as door moisture barrier 322A. Because the lower portion of the door abuts the corresponding surface of the door frame threshold at finish piece 332, the lower portion of internal door frame segment 320A is also not exposed as long as the door is closed. Accordingly, the paulownia material of internal door frame segment 320A provides thermal, weight and other benefits while the denser, higher-modulus and/or more conductive exterior frame members provide resilient and robust exterior and interior door surfaces 314, 318.

The threshold frame portion of door frame 310 is fixed to wall 360 of a building in similar fashion to window frame 210 described above. However, the frame structure illustrated in FIG. 4 excludes any lower exterior external frame segment, using only a series of outer moisture barriers 322B, 322C and 322D to form exterior surface 314 along the door frame threshold. Mounted behind and underneath the moisture barriers 322B, 322C, 322D is internal door frame segment 320B, which is protected from exposure to the outside environment as illustrated. Air pockets 326 and 328A are bounded by internal door frame segment 320B and moisture barriers 322C, 322D, respectively, as illustrated. A further air pocket 328B is bounded by moisture barrier 322B of the door frame threshold and a lower portion of moisture barrier 322A of the door, as illustrated.

At interior surface 318 of door frame 310, the paulownia internal door frame segment 320B is protected from exposure by interior external door frame segment 316C, which is affixed (e.g., adhesively) to the abutting surface of internal door frame segment 320B.

Thus, as shown in FIG. 4, and described in detail above, internal door frame segment 320A and internal door frame segment 320B span substantially the entire vertical distance between the lower edge of door window 350 and the adjacent upper edge of wall 360, such that the composite door frame 310 provides a substantially uninterrupted and comprehensive thermal barrier against thermal transfer between the inside and outside of the building.

Figure 5:
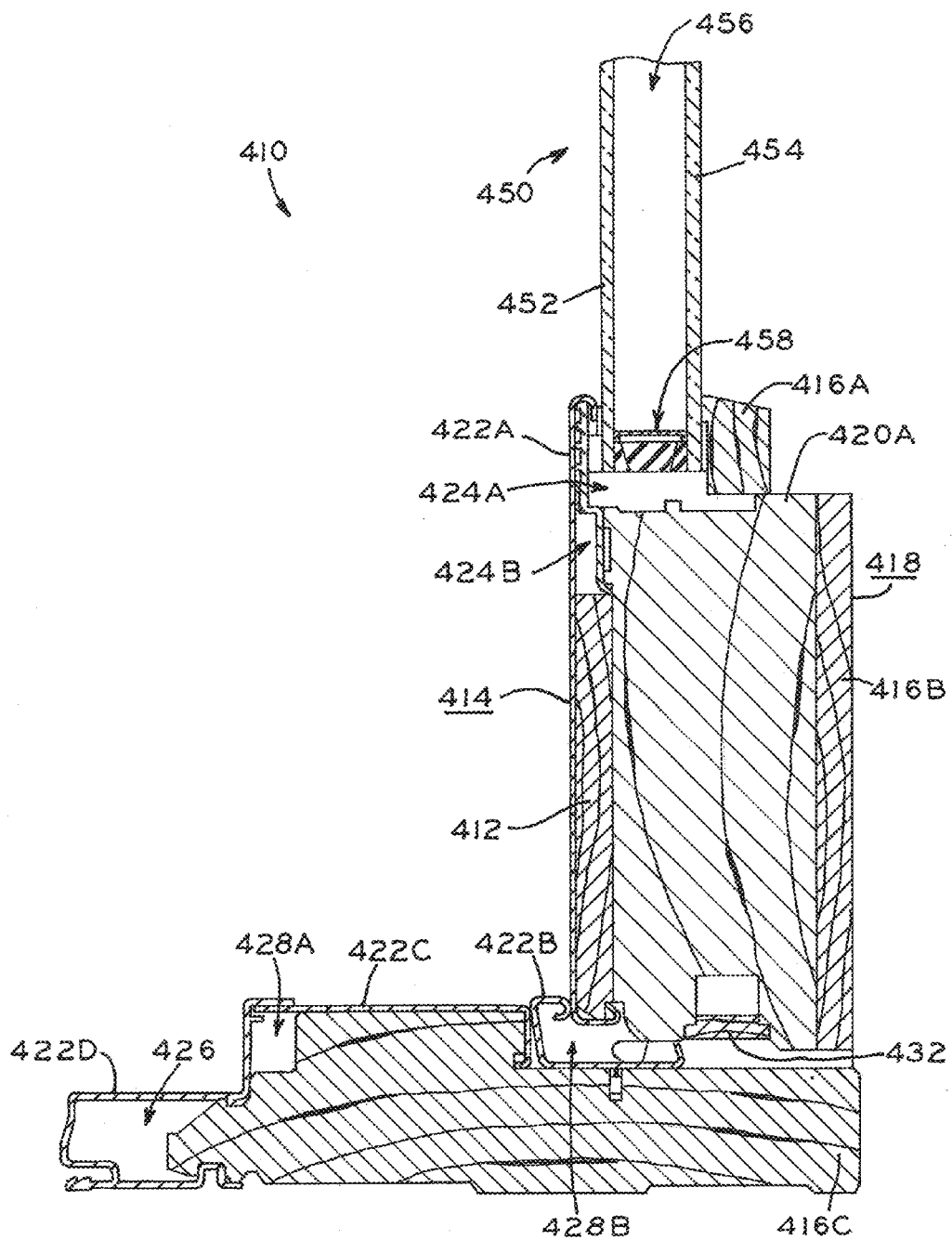
FIG. 5 is a cross-section, elevation view of another threshold of a door frame in accordance with the present disclosure, it being understood that the door frame may have jambs and header with substantially identical cross-sections.

Turning now to FIG. 5, another composite door frame 410 is illustrated for use with a pivoting glass door in similar fashion to composite door frame 310 described above. Corresponding structures of door frame 410 and door frame 310 have corresponding reference numerals, with structures of door frame 410 having 100 added thereto. Except as otherwise described, door frames 310 and 410 are identical in overall structure and function.

The lower internal door frame segment 320B appearing in FIG. 4 has no analog in FIG. 5. Instead, door frame 410 includes a single solid external frame segment 416C extending from interior surface 418 into abutment with moisture barriers 422B, 422C, 422D, which in turn form exterior surface 414 along the threshold portion of door frame 410. The omission of a lower paulownia frame portion in the fixed-frame threshold may be made in the case of composite door frame 410 in order to promote simplicity of construction while incurring only a modest penalty in thermal transfer properties between the interior and exterior of the building to which door frame 410 is installed. This is because the substantial width of the threshold (as compared to the smaller width of the sash) disposes a large amount of material between interior surface 418 and exterior surface 414, which in turn enables an adequate thermal barrier even using only traditional hardwood or soft wood materials. As illustrated, however, internal door frame segment 420A is still provided in the door sash to provide the thermal barrier needed for the less thick sash portion of composite door frame 410.

Figure 6:
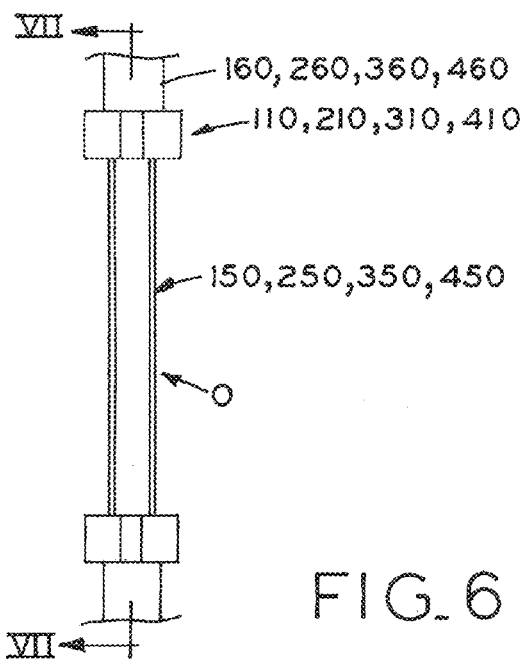
FIG. 6 is a schematic cross-section, elevation view of the fenestration frames of any of FIGS. 2-5, with the frame mounted to a wall and containing a window or door.
Figure 7:
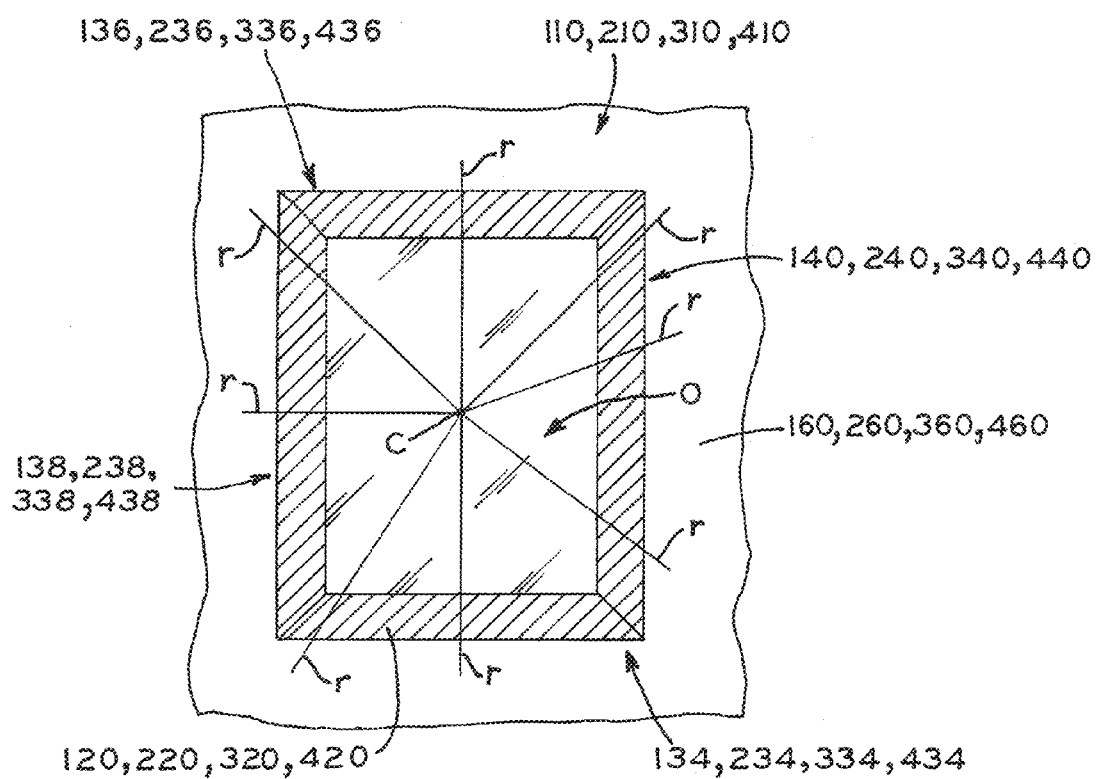
FIG. 7 is a schematic cross-section, elevation view of the fenestration frame and wall shown in FIG. 6, taken along line VII-VII of FIG. 6.

FIGS. 6 and 7 schematically illustrate composite fenestration frames 110, 210, 310 and 410 to show their complete peripheries. FIGS. 6 and 7 show composite fenestration frames 110, 210, 310 and 410 in a simplified fashion for clarity and simplicity (similar to the schematic version shown in FIG. 2), it being be understood that the view of FIGS. 6 and 7 is also intended to represent the relatively more complex geometries and arrangements of window frame 210 and door frames 310, 410.

FIG. 7 shows a cross-sectional view of frames 110, 210, 310 and 410, taken through the respective paulownia internal frame segments 120, 220, 320, 420. As illustrated, any of frames 110, 210, 310, 410, when viewed in this perspective, define a sill or threshold 134, 234, 334, 434 at a lower edge of a fenestration opening O, a frame header 136, 236, 336, 436 at an opposed upper edge of fenestration opening O, and a left jamb 138, 238, 338, 438 and right jamb 140, 240, 340, 440 extending respectively between left and right ends of sill or threshold 134, 234, 334, 434 and header 136, 236, 336, 436. Mitered or mortised-and-tenoned corners between each of the various frame components may be provided to form a complete frame periphery extending entirely around fenestration opening O, as illustrated. As noted above with respect to individual frame designs, and shown in FIG. 7, internal frame segments 120, 220, 320, 420 may have corresponding counterparts in the respective headers and left and right jambs so that an uninterrupted paulownia periphery is formed around fenestration opening O.

In the illustration of FIG. 7, fenestration opening O is a generally rectangular shape of the sort typically used for residential or commercial windows and doors. Of course, other shapes may be utilized within the scope of the present disclosure, as required or desired for a particular application. Regardless of the particular frame shape chosen, a geometric center C of opening O may be defined within the bounds of frame 110, 210, 310, 410. A plurality of rays r extend radially outwardly from center C in all directions, with a representative sample of rays r shown in FIG. 7. Each such ray R passes from fenestration opening O to wall 160, 260, 360, 460 via fenestration frame 110, 210, 310 or 410. Because a solid and uninterrupted area of paulownia material is provided in sill/threshold 134, 234, 334, 434, header 136, 236, 336, 436, left jamb 138, 238, 338, 438, and/or right jamb 140, 240, 340, 440, each ray r must extend across a threshold of paulownia material as it extends from the area of opening O to the area of wall 160, 260, 360, 460. In this way, frames 110, 210, 310, 410 each provide an internal frame segment made of paulownia which extends across substantially the entire radial extent of each respective frame member and occupies substantially the entire gap between fenestration opening O and the adjacent portion of wall 160, 260, 360 or 460. Thus, because the paulownia internal frame segment provides a thermal barrier with low thermal transfer between the inside and outside of the building, and because the entire radial extent of the frame includes this thermal barrier, frames 110, 210, 310 and 410 each form a comprehensive thermal barrier between an interior space and an exterior space of the building when the fenestration frame is installed at fenestration opening O.

In one exemplary embodiment, installation of paulownia internal frame segments 120, 220, 320, 420 may occur prior to installation of one or both of the exterior frame segments 112, 212, 312, 412 and interior frame segments 116, 216, 316, 416. For example, exterior frame segments 112, 212, 312, 412 may in installed around the periphery of the fenestration (e.g., around the opening in the wall of the building intended for a window or door) and adjacent or abutting the exterior wall of the building. Internal frame segments 120, 220, 320, 420 may then be installed from the interior of the building around the entire periphery of the fenestration to create central opening O as shown in FIG. 7 and described above. At this point, internal frame segments 120, 220, 320, 420 are completely covered from the exterior by exterior frame segments 112, 212, 312, 412 but remain accessible from the interior. Next, interior frame segments 116, 216, 316, 416 are installed at the periphery of the fenestration and adjacent the interior wall of the building, such that interior frame segments 116, 216, 316, 416 completely cover internal frame segments 120, 220, 320, 420 as described in detail above.

Alternatively, installation methods may be modified in any permutation of the above steps, except that internal frame segments 120, 220, 320, 420 must be installed prior exterior frame segments 112, 212, 312, 412 and/or interior frame segments 116, 216, 316, 416. That is, internal frame segments 120, 220, 320, 420 can be installed from the interior of the building prior to installation of interior frame segments 116, 216, 316, 416 as detailed above, or from the exterior of the building prior to installation of exterior frame segments 112, 212, 312, 412 in a similar fashion. Of course, internal frame segments 120, 220, 320, 420 may installed before installation of any of exterior frame segments 112, 212, 312, 412 or interior frame segments 116, 216, 316, 416.

Further, it is completed that installation of internal frame segments 120, 220, 320, 420, exterior frame segments 112, 212, 312, 412 and interior frame segments 116, 216, 316, 416 may all occur away from the site of the building itself, that is, frames 110, 210, 310, 410 may be pre-fabricated and then installed in a fenestration opening of a building as a pre-assembled unit. The same principles apply to assembly of the pre-assembled unit as to the site-built unit.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The following is claimed:

1. A composite fenestration frame comprising:
a plurality of frame segments defining a central opening through the composite fenestration frame, the plurality of frame segments cooperating to define an exterior frame surface on one side of the central opening and an interior frame surface on an opposing side of the central opening when the composite fenestration frame is installed into a wall;
at least one of the plurality of frame segments comprising an internal frame segment made from paulownia and a plurality of external frame segments made from a second material having a material property different from paulownia, the external frame segments respectively defining the exterior and interior frame surfaces such that the internal frame segment substantially completely covered by the exterior frame surface and the interior frame surface, whereby the internal frame segment is not exposed at the interior frame surface or the exterior frame surface when the composite fenestration frame is installed into the wall.

2. The composite fenestration frame of claim 1, wherein the composite fenestration frame forms a door frame, the plurality of frame segments comprising a threshold, a header opposed to the threshold, a left jamb and a right jamb, the central opening sized to receive a central door panel.

3. The composite fenestration frame of claim 2, wherein the internal frame segment extends across substantially an entire radial extent of at least one of the threshold, the header, the left jamb and the right jamb, whereby the internal frame segment forms a comprehensive thermal barrier between an interior space and an exterior space when the door frame is installed.

4. The composite fenestration frame of claim 1, wherein the composite fenestration frame comprises a window frame, the plurality of frame segments comprising a sill, a header opposed to the sill, a left jamb and a right jamb, the central opening sized to receive a pane of glass.

5. The composite fenestration frame of claim 4, wherein the internal frame segment extends across substantially an entire radial extent of at least one of the sill, the header, the left jamb and the right jamb, whereby the internal frame segment forms a comprehensive thermal barrier between an interior space and an exterior space when the window frame is installed.

6. The composite fenestration frame of claim 4, wherein the second material comprises at least one of pine, spruce, fir, oak, cedar, maple, cherry, redwood, walnut, bamboo, mahogany, teak, and ipe.

7. The composite fenestration frame of claim 1, wherein the plurality of frame segments comprises:
   a lower frame segment defining a lower fenestration frame width, the internal frame segment comprising a lower paulownia segment disposed within the lower frame segment and extending substantially entirely across the lower fenestration frame width;
   an upper frame segment opposed to the lower frame segment and defining an upper fenestration frame width, the internal frame segment comprising an upper paulownia segment disposed within the upper frame segment and extending substantially entirely across the upper fenestration frame width;
   a left jamb extending from a left end of the lower frame segment to a left end of the upper frame segment, the left jamb defining a left fenestration frame height, the internal frame segment comprising a left paulownia segment disposed within the left jamb and extending substantially entirely across the left fenestration frame height; and
   a right jamb extending from a right end of the lower frame segment to a right end of the upper frame segment, the right jamb defining a right fenestration frame height, the internal frame segment comprising a right paulownia segment disposed within the right jamb and extending substantially entirely across the right fenestration frame height,
   whereby the internal frame segment substantially encloses the central opening to form a paulownia frame contained within the composite fenestration frame.

8. The composite fenestration frame claim 1, further comprising an exterior moisture barrier disposed at the exterior frame surface and extending around the central opening.

9. The composite fenestration frame of claim 1, wherein the external frame segments comprise a pair of segments including an external interior frame segment and an external exterior frame segment, and wherein:
   an interior-facing surface of the internal frame segment is bonded to the external interior frame segment; and
   an exterior-facing surface of the internal frame segment is bonded to the external exterior frame segment,
   whereby the internal frame segment and the external frame segments form a laminated structure with the external exterior frame segment facing an exterior space on an exterior side of the composite fenestration frame and the external interior frame segment facing an interior space on an interior side of the composite fenestration frame, the internal frame segment hidden by the external interior and exterior frame segments.

10. The composite fenestration frame of claim 1, wherein the material property is modulus of elasticity.

11. The composite fenestration frame of claim 1, wherein the material property is density.

12. The composite fenestration frame of claim 1, wherein the material property is thermal conductivity.

13. The composite fenestration frame of claim 1, wherein the composite fenestration frame forms a door sash, the plurality of frame segments comprising upper and lower rails and a left and right stiles, the central opening sized to receive a door panel.

14. The composite fenestration frame of claim 1, wherein the composite fenestration frame forms a window sash, the plurality of frame segments comprising upper and lower rails and a left and right stiles, the central opening sized to receive a window pane.

15. A method of installing a composite fenestration frame of a building, the method comprising:
   installing an internal frame segment made from paulownia at a peripheral portion of a fenestration opening;
   installing a first external frame segment at the peripheral portion of the fenestration opening and adjacent an interior wall of the building, such that the first external frame segment substantially completely covers the internal frame segment from the interior of the building and the internal frame segment is not exposed when facing the interior wall of the building, the first external frame segment made from a first material having a material property different from paulownia; and
   installing a second external frame segment at the peripheral portion of the fenestration opening and adjacent an exterior wall of the building, such that the second external frame segment substantially completely covers the internal frame segment from the exterior of the building and the internal frame segment is not exposed when facing the exterior wall of the building, the second external frame segment made from a second material having a material property different from paulownia.

16. The method of claim 15, wherein:
   the step of installing an internal frame segment comprises installing upper, lower, left and right internal frame segments forming a paulownia frame which extends substantially completely around the fenestration opening to form an enclosed central opening contained within the fenestration opening;
   the step of installing a first external frame segment comprises installing upper, lower, left and right interior frame segments to define an interior frame surface bounding the fenestration opening adjacent the interior wall, such that the interior frame surface substantially completely covers the upper, lower, left and right internal frame segments respectively from the interior of the building; and
   the step of installing a second external frame segment comprises installing upper, lower, left and right exterior frame segments to define an exterior frame surface bounding the fenestration opening adjacent the exterior wall, such that the exterior frame surface substantially completely covers the upper, lower, left and right internal frame segments respectively from the exterior of the building.

17. The method of claim 16, further comprising installing one of a window and a door in the enclosed central opening.

18. A method of assembling a composite fenestration frame having an interior side and an exterior side, the method comprising:
   forming at least a portion of a periphery of the composite fenestration frame with an internal frame segment made from paulownia, the internal frame segment having at least one exterior-facing surface and at least one interior-facing surface opposed to the exterior-facing surface;

assembling an interior frame segment over the interior-facing surface of the internal frame segment at the periphery of the composite fenestration frame, such that the interior frame segment substantially completely covers the interior-facing surface of internal frame segment and the internal frame segment is not exposed when facing the interior side of the composite fenestration frame, the interior frame segment made from a first material having a material property different from paulownia; and assembling an exterior frame segment over the exterior-facing surface of the internal frame segment at the periphery of the composite fenestration frame, such that the exterior frame segment substantially completely covers the exterior-facing surface of internal frame segment and the internal frame segment is not exposed when facing the exterior side of the composite fenestration frame, the exterior frame segment made from a second material having a material property different from paulownia.

19. The method of claim 18, wherein:

the step of forming at least a portion of a periphery of the composite fenestration frame comprises assembling upper, lower, left and right internal frame segments to one another, such that the internal frame segments extend substantially completely around the periphery of the composite fenestration frame;

the step of assembling an interior frame segment comprises assembling upper, lower, left and right interior frame segments over respective interior-facing surfaces of the upper, lower, left and right internal frame segments, such that the interior frame segments extend substantially completely around the periphery of the composite fenestration frame; and the step of assembling an exterior frame segment comprises assembling upper, lower, left and right exterior frame segments over respective exterior-facing surfaces of the upper, lower, left and right internal frame segments, such that the exterior frame segments extend substantially completely around the periphery of the composite fenestration frame.

20. The method of claim 19, further comprising assembling one of a window and a door within the periphery of the composite fenestration frame to form one of a pre-fabricated window and door respectively.

* * * * *